United States Patent [19]

Levin et al.

[11] 3,886,194

[45] May 27, 1975

[54] N-PHENOXYALKYL-L-THIOCYANOALKANAMIDES

[75] Inventors: Alfred A. Levin, Skokie; Sidney B. Richter, Chicago, both of Ill.

[73] Assignee: Velsicol Chemical Corporation, Chicago, Ill.

[22] Filed: Mar. 20, 1972

[21] Appl. No.: 236,299

Related U.S. Application Data

[63] Continuation-in-part of Ser. No. 826,706, May 21, 1969, abahdoned.

[52] U.S. Cl. 260/454; 260/561 R; 260/561 HL; 260/573; 260/612 D; 210/64; 71/67; 71/98; 71/104
[51] Int. Cl.$^2$ C07C 161/02
[58] Field of Search 260/454; 71/67, 118, 104

[56] References Cited
UNITED STATES PATENTS

| | | | |
|---|---|---|---|
| 2,419,888 | 4/1947 | Nolan et al. | 260/454 |
| 3,141,758 | 7/1964 | Hamm et al. | 71/118 |
| 3,141,818 | 7/1964 | Stephens et al. | 260/454 |
| 3,252,855 | 5/1966 | Wehner | 71/67 |
| 3,586,496 | 6/1971 | Chupp | 71/67 |

OTHER PUBLICATIONS

Galashina et al., "Preharoest removal of cotton plant leaves" (1958) CA 54 pp. 10217–10218 (1960).
Koenig et al," d-Subs.ketones etc;" (1968) CA 70 no. 37467d. (1969)

Primary Examiner—Glennon H. Hollrah
Attorney, Agent, or Firm—Robert J. Schwarz; Dietmar H. Olesch

[57] ABSTRACT

This invention discloses new compounds of the formula

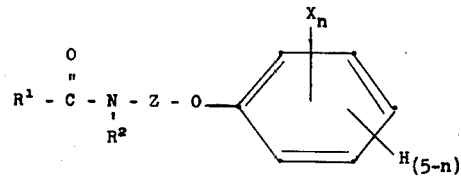

wherein $R^1$ is selected from the group consisting of alkyl, haloalkyl and thiocyanoalkyl; $R^2$ is selected from the group consisting of hydrogen, alkyl, alkenyl, alkynyl, alkoxyalkyl and haloalkyl; Z is an alkylene group of from one to four carbon atoms; X is selected from the group consisting of alkyl, alkenyl, halogen, alkoxy, alkylthio, nitro and dialkylamino; and n is an integer from 0 to 5. Further disclosed is a method for the control of algae which comprises contacting said algae with an effective amount of a compound of the above description.

2 Claims, No Drawings

N-PHENOXYALKYL-L-THIOCYANOALKANAMIDES

This is a continuation-in-part of the copending application Ser. No. 826,706, filed May 21, 1969 now abandoned.

This invention relates to new compositions of matter, and more particularly relates to new compounds of the formula

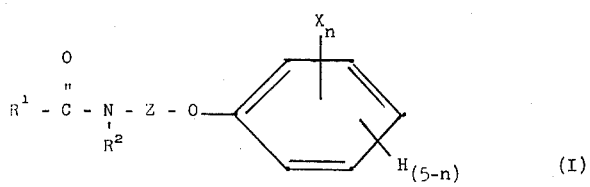

(I)

wherein $R^1$ is selected from the group consisting of alkyl, haloalkyl and thiocyanoalkyl; $R^2$ is selected from the group consisting of hydrogen, alkyl, alkenyl, alkynyl, alkoxyalkyl and haloalkyl; Z is an alkylene group of from one to four carbon atoms; X is selected from the group consisting of alkyl, alkenyl, halogen, alkoxy, alkylthio, nitro and dialkylamino; and n is an integer from 0 to 5.

In a preferred embodiment of the present invention the substituent $R^1$ is selected from the group consisting of lower alkyl, lower chloroalkyl, lower bromoalkyl and lower thiocyanoalkyl; $R_2$ is selected from the group consisting of hydrogen, lower alkyl, lower alkenyl, lower alkoxyalkyl, lower chloroalkyl and lower bromoalkyl; Z is an alkylene group of from one to three carbon atoms; X is selected from the group consisting of lower alkyl, lower alkenyl, chlorine, bromine, fluorine, lower alkoxy, lower alkylthio, nitro and di(lower alkyl)amino; and n is an integer from 0 to 3.

The compounds of the present invention are unexpectedly useful as algaecides.

The new compounds of this invention can be readily prepared from a phenoxyalkylene-amine of the formula

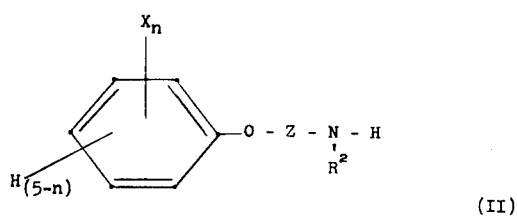

(II)

wherein X, n, Z and $R^2$ are as heretofore described, by reaction with an acid chloride or substituted acid chloride of the formula

(III)

wherein $R^1$ is as described above. This reaction can be conveniently effected by combining the reactants in an inert organic reaction medium such as benzene, toluene, or the like, in the presence of an acid acceptor such as a tertiary amine, an alkali metal hydroxide or carbonate, and the like. This reaction is exothermic in many instances and a controlled addition of the acid chloride and/or external cooling may be desirable. After the addition of the acid chloride is completed, the reaction mixture can be stirred for a period of from about ½ to about 4 hours to insure the completion of the reaction. After this time the reaction mixture can be washed with water to remove the acid acceptor chloride which has formed and can be dried and the solvent evaporated under reduced pressure to yield the desired product. This product can then be used as such or can be further purified by recrystallization if the product is a solid or by distillation if the product is an oil.

The compounds of the present invention wherein $R^1$ is thiocyanoalkyl can also be prepared from the corresponding compound wherein $R^1$ is haloalkyl, preferably chloro or bromo alkyl, by reaction with potassium thiocyanide. This reaction well known in the art can be effected by adding a solution of the potassium thiocyanate to a solution of the haloalkylamide at room temperature with vigorous stirring. Small amounts of sodium iodide can be used to catalyze the reaction. After the addition is completed, the reaction mixture can be heated at reflux for a period of from about 1 to about 8 hours to insure the completion of the reaction. After this time the reaction mixture is filtered and is stripped of solvents under reduced pressure to yield a residue. This residue can be extracted with benzene, and the benzene extract can be evaporated to yield the desired product.

The starting-material amines of Formula II which are used to prepare the new compounds of the present invention are generally known in the art and can be readily prepared from phenoxyalkylene-nitriles by reduction with lithium aluminum hydride or from phenoxyalkylene-bromides by reaction with primary amines.

The preparation of the phenoxyalkyl amine of Formula II can be effected by changing a solution of an amine of the formula

(IV)

wherein $R^2$ as hereinabove described in an inert organic solvent such as methanol into a suitable reaction vessel equipped with a mechanical stirrer, reflux condenser and addition funnel. The solution can then be stirred and a phenoxyalkyl bromide of the formula

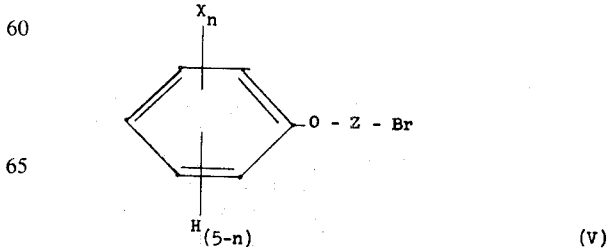

(V)

wherein X, n, and Z are as heretofore described, dissolved in the inorganic solvent used for the amine, is slowly added thereto. After the addition is completed the mixture can be heated at reflux for a period of from about ½ to about 8 hours. After this time the reaction mixture can be stripped of solvent and the residue can be treated with aqueous sodium hydroxide to liberate the desired free amine as an oil. This product can be used as such or can be further purified by dissolving it in ether, washing the ether solution with water, drying the washed ether solution over anhydrous magnesium sulfate and stripping off the ether to yield the phenoxyalkylamine of Formula II.

The phenoxyalkyl bromides of Formula V are generally known in the art but when not conveniently available can be readily prepared from a phenol of the formula

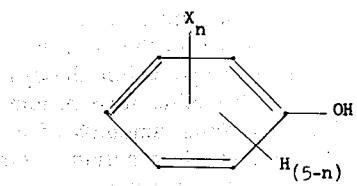

(VI)

wherein X and n are as heretofore described, by reaction with a dibromoalkane of the formula

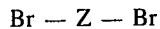

(VII)

wherein Z is as heretofore described. This reaction can be effected by charging a molar amount of the phenol, an excess molar amount of the dibromoalkane and water into a suitable reaction vessel equipped with a stirrer, reflux condenser and addition funnel. The mixture can then be heated at reflux and aqueous sodium hydroxide in excess of the molar amount of the phenol used is slowly added to the mixture. After the addition is completed, heating and stirring can be continued for a period of from about ½ to about 8 hours to insure completion of the reaction. After this time the mixture can be cooled and extracted with ether. The ether extract can then be washed with water, dried over anhydrous magnesium sulfate and stripped to solvent to yield the desired product as the residue.

The preparation of the compounds of the present invention is more specifically illustrated in the following examples.

Example 1

Preparation of β-(3,4-Dichlorophenoxy)-ethylamine

A slurry of lithium aluminum hydride (3.5 grams; 0.1 mol) in ether (100 ml) was charged into a 1 liter three-necked glass reaction flask fitted with mechanical stirrer, reflux condenser and dropping funnel. The slurry was stirred vigorously and a solution of 3,4-dichlorophenoxyacetonitrile (15 grams; 0.074 mol) in ether (50 ml) was added dropwise over a period of about 30 minutes. The mixture was then heated at reflux with stirring for a period of about 2 hours. The reaction mixture was then cooled and first wet ether (200 ml) and then water (400 ml) was slowly added with stirring. The mixture was filtered and the ether layer was separated and washed with two 500 ml portions of saturated aqueous sodium chloride. The washed solution was then dried over anhydrous magnesium sulfate, was filtered and stripped of ether to yield an orange colored oil. This oil was distilled under reduced pressure to yield the desired product β-(3,4-dichlorophenoxy)ethylamine having a boiling point of 132° C at 0.3 mm of Hg pressure and an index of refraction at 25° C of 1.5657.

Example 2

Preparation of N-[β-(3,4-Dichlorophenoxy)-ethyl]-propionamide

A solution of β-(3,4-dichlorophenoxy) ethylamine (3.7 grams; 0.018 mol) and triethylamine (1.8 grams) dissolved in benzene (50 ml) was charged into a glass reaction flask equipped with mechanical stirrer and addition funnel. This mixture was stirred and a solution of propionyl chloride (1.67 grams; 0.018 mol) in benzene (20 ml) was slowly added thereto. An exotherm was observed. After the addition was completed, the mixture was stirred for an additional period of ½ hour. After this time the reaction mixture was filtered. The resulting benzene solution was then washed with dilute aqueous hydrochloric acid and with water and was dried over anhydrous magnesium sulfate. The dried solution was filtered and stripped of solvents to yield an oil. This oil solidified upon trituration with pentane. This solid was recovered by filtration to yield the desired product N-[β-(3,4-dichlorophenoxy)-ethyl]-propionamide having a melting point of 63° to 64° C.

Example 3

Preparation of β-(2,6-Dimethylphenoxy)ethyl bromide

A slurry of 2,6-dimethylphenol (100 grams; 0.82 mol) and 1,2-dibromoethane (252 grams; 1.34 mol) in water (125 ml) was charged into a 1 liter three-necked glass reaction flask equipped with mechanical stirrer, reflux condenser and dropping funnel. The mixture was heated to reflux and a solution of sodium hydroxide (54 grams; 1.35 mol) in water (500 ml) was added to the mixture with stirring over a period of about 1 hour. The reaction mixture was then heated at reflux with stirring for an additional period of 4½ hours. After this time the mixture was cooled and extracted twice with ether. The ether extracts were combined, washed with water and dried over anhydrous magnesium sulfate. The dried solution was then filtered and the ether stripped resulting in an oil. This oil was washed with aqueous sodium hydroxide to remove any unreacted phenol and was redissolved in ether. The ether solution was washed with water and dried over anhydrous magnesium sulfate. This dried solution was stripped of ether to yield an oil. The oil was distilled under reduced pressure to yield the desired product β-(2,6-dimethylphenoxy)ethyl bromide as a pale yellow oil having a boiling point of 78° C at 0.5 mm of Hg pressure and an index of refraction at 25° C of 1.5354.

Example 4

Preparation of N-Methyl-N-[β-(2,6-dimethylphenoxy)-ethyl]-amine

A solution of methylamine (50 grams) in methanol (180 ml) was placed in a three-necked glass reaction flask equipped with a mechanical stirrer, addition funnel and reflux condenser. β-(2,6-Dimethylphenoxy)-ethylbromide (22.9 grams; 0.1 mol) dissolved in methanol (20 ml) was added dropwise to the flask over a period of about 30 minutes with continuous stirring. After the addition was completed, the mixture was heated at reflux with stirring for a period of about 2 hours. After this time the reaction mixture was stripped of methanol under reduced pressure to yield a solid. This solid was treated with aqueous sodium hydroxide to yield an oil which was dissolved in ether. The ether solution was washed with water and was dried over anhydrous magnesium sulfate. The dried solution was filtered and the ether was evaporated on a steam bath leaving a yellow oil. This oil was distilled under reduced pressure to yield the desired product N-methyl-N-[β-(2,6-dimethylphenoxy)-ethyl]-amine as a colorless oil having a boiling point of 78 to 80° C at 0.1 mm of Hg pressure and a refractive index at 28° C of 1.5130.

Example 5

Preparation of
N-Methyl-N-[β-(2,6-dimethylphenoxy)-ethyl]-α-chloroacetamide

A solution of N-methyl-N-[β-(2,6-dimethylphenoxy)-ethyl]-amine (10.2 grams; 0.057 mol) and triethylamine (5.7 grams) in benzene (80 ml) was charged into a glass reaction vessel equipped with a mechanical stirrer, reflux condenser and addition funnel. The solution was stirred and cooled in an ice bath and chloroacetyl chloride (6.4 grams; 0.057 mol) dissolved in benzene (20 ml) was added dropwise over several minutes. An exotherm was observed. After the addition was completed, the mixture was stirred for an additional period of about 30 minutes. After this time the mixture was filtered to remove the triethylamine hydrochloride. The filtered solution was washed with aqueous hydrochloric acid and with water, was dried over anhydrous magnesium sulfate and was filtered. The solution was then stripped of solvent under reduced pressure to yield an oil. This oil was triturated with pentane resulting in the formation of a yellow solid. This solid was washed with pentane and was recrystallized from heptane to yield the desired product N-methyl-N-[β-(2,6-dimethylphenoxy)-ethyl-]-α-chloroacetamide having a melting point of 78° to 79° C.

Example 6

Preparation of
N-Methyl-N-[β-(2,6-dimethylphenoxy)-ethyl]-α-thiocyanoacetamide

N-Methyl-N-[β-(2,6-dimethylphenoxy)-ethyl]-α-chloroacetamide (4.7 grams; 0.018 mol), potassium thiocyanate (3.24 grams), ethanol (50 ml), a small amount of sodium iodide and sufficient acetone to cause solution of the mixture were charged into a glass reaction vessel equipped with mechanical stirrer and reflux condenser. The reaction mixture was heated at reflux with stirring for a period of about 2 hours. After this time the mixture was cooled and filtered. The filtered solution was then stripped of solvent under reduced pressure to yield a solid. This solid was extracted with three 50-ml portions of boiling benzene, and the benzene extracts were combined and filtered. The benzene solution was then stripped under reduced pressure to yield an oil which on trituration with cold pentane solidified. The solid was recovered by filtration, was washed with pentane and was recrystallized from a benzene-pentane mixture to yield the desired product N-methyl-N-[β-(2,6-dimethylphenoxy)-ethyl]-α-thiocyanoacetamide having a melting point of 81° to 83° C.

EXAMPLE 7

Preparation of β-(3,4-Dichlorophenoxy)-ethyl bromide

A mixture of 3,4-dichlorophenol (50 grams; 0.031 mol) 1,2,-dibromoethane (94.2 grams; 0.5 mol) and water (125 ml) were charged into a glass reaction vessel equipped with mechanical stirrer, reflux condenser and addition funnel. The mixture was heated to reflux with stirring and the solution of sodium hydroxide (20.1 grams; 0.5 mol) in water (200 ml) was slowly added over a period of about 1 hour. After the addition was completed, heating and stirring were continued for an additional 4 hours. After this time the mixture was cooled, was extracted with ether and the ether extract washed with water and dried over anhydrous magnesium sulfate. The dried solution was filtered and stripped of ether to yield an oil. The oil was washed with aqueous sodium hydroxide to remove any unreacted phenol and was dissolved in ether. The ether solution was dried over anhydrous magnesium sulfate, filtered and stripped of solvent to yield an oil. This oil was distilled under reduced pressure to yield the desired product β-(3,4-dichlorophenoxy)ethylbromide as a yellow oil having a boiling point of 112° to 114° C at 0.1 mm of Hg pressure and a refractive index at 25° C of 1.5795.

EXAMPLE 8

Preparation of
N-Methyl-N-[β-(3,4-dichlorophenoxy)-ethyl]-amine

A solution of methylamine (50 grams) in methanol (180 ml) was prepared in a 500 ml glass reaction flask equipped with mechanical stirrer, reflux condenser and internal thermometer, and β-(3,4-dichlorophenoxy)-ethyl-bromide (23.5 grams; 0.087 mol) dissolved in methanol (20 ml) was added dropwise thereto over a period of about 30 minutes. The reaction mixture was then heated at reflux for a period of about 2 hours. After this time the reaction mixture was stripped of methanol under reduced pressure to yield a yellow solid. This solid was treated with aqueous sodium hydroxide to liberate the free amine. The amine was then dissolved in ether and the ether solution washed with cold water and dried over magnesium sulfate. The dried solution was filtered and evaporated on a steam bath to yield an oil. This oil was distilled under reduced pressure to yield the desired product N-methyl-N-[β-(3,4-dichlorophenoxy)-ethyl]-amine as a yellow oil having a boiling point of 110° to 112° C at 0.1 mm of Hg pressure and an index of refraction at 26° C of 1.5493.

EXAMPLE 9

Preparation of
N-Methyl-N-[β-(3,4-dichlorophenoxy)-ethyl]-α-chloroacetamide

A solution of N-methyl-N-[β-(3,4-dichlorophanoxy)-ethyl]-amine (10.8 grams; 0.049 mol) and triethylamine (5 grams) in benzene (80 ml) was charged into a glass reaction vessel equipped with mechanical stirrer, reflux condenser and addition funnel. The reaction mixture was stirred and a solution of chloroacetyl chloride (5.5 grams; 0.05 mol) in benzene (20 ml) was added dropwise over a period of about 10 minutes. An exotherm was observed. After the addition was completed the reaction mixture was stirred for an additional period of about 30 minutes. After this time the mixture was filtered and was washed with two portions of dilute aqueous hydrochloric acid and with water. The washed solution was dried over anhydrous magnesium sulfate and was filtered. The filtered solution was stripped of benzene under reduced pressure to yield an oil which upon trituration with pentane solidified. The solid was recovered by filtration to yield the desired product N-methyl-N-[β-(3,4-dichlorophenoxy)-ethyl]-α-chloroacetamide having a melting point of 71° to 72° C.

EXAMPLE 10

Preparation of
N-Methyl-N-[β-(3,4-dichlorophenoxy)-ethyl]-α-thiocyanoacetamide

A mixture of N-methyl-N-[β-(3,4-dichlorophenoxy)-ethyl]-α-chloroacetamide (6.9 grams; 0.023 mol) and ethanol (50 ml) was placed in a glass reaction flask and sufficient acetone was added until the mixture dissolved. Potassium thiocyanate (4.15 grams) and a few crystals of sodium iodide were added, and the reaction mixture was heated at reflux with stirring for a period of about 3 hours. After this time the reaction mixture was filtered, and the filtrate was stripped of solvent under reduced pressure to yield a slushy solid. The solid was treated with three 50-ml portions of boiling benzene, and the benzene extracts were combined and filtered. The filtered benzene solution was then stripped under reduced pressure to yield an oil which crystallized upon standing. These crystals were then recrystallized from a benzene-pentane mixture to yield the desired product N-methyl-N-[β-(3,4-dichlorophenoxy)-ethyl]-α-thiocyanoacetamide having a melting point of 63° to 64° C.

EXAMPLE 11

Preparation of
N-Methyl-N-[β-(3,4-dichlorophenoxy)-ethyl]-propionamide

A solution of N-methyl-N-[β-(3,4-dichlorophenoxy)-ethyl]-amine (9 grams; 0.049 mol) and triethylamine (5 grams) in benzene (50 ml) was vigorously stirred in a glass reaction flask equipped with mechanical stirrer, reflux condenser and addition funnel, and a solution of propionyl chloride (4.6 grams; 0.049 mol) in benzene (20 ml) was added dropwise over a period of several minutes. An exotherm was observed. After the addition was completed, the reaction mixture was stirred for an additional period of about 30 minutes. After this time the reaction mixture was filtered to remove the triethylamine hydrochloride. The filtrate was then washed with two 250-ml portions of dilute aqueous hydrochloric acid and with water and was dried over anhydrous magnesium sulfate. The dried solution was then filtered and stripped of benzene under reduced pressure to yield an oil. The oil wad distilled under reduced pressure to yield the desired product, N-methyl-N-[β-(3,4-dichlorophenoxy)-ethyl]-propionamide as a yellow oil having a boiling point of 168° to 172° C at 0.7 mm of Hg pressure and a refractive index at 25° C of 1.5468.

EXAMPLE 12

Preparation of
N-n-Propyl-N-[β-(2,6-dimethylphenoxy)-ethyl]α-chloroacetamide

A solution of N-n-propyl-N-[β(2,6-dimethylphenoxy)-ethyl]-amine (16 grams; 0.077 mol) and triethylamine (7.7 grams) in benzene (100 ml) was charged into a glass reaction flask equipped with mechanical stirrer, reflux condenser and addition funnel. The solution was stirred vigorously and a solution of chloroacetyl chloride (8.8 grams; 0.078 mol) in benzene (20 ml) was added over a period of about 15 minutes. An exotherm was observed. After the addition was completed, the reaction mixture was stirred for an additional period of about 1 hour. After this time the mixture was filtered and the filtrate was washed with dilute aqueous hydrochloric acid and with water. The washed filtrate was then dried over magnesium sulfate, was filtered and stripped of benzene under reduced pressure to yield a dark colored oil. This oil was distilled under reduced pressure to yield the desired product N-n-propyl-N-[β-(2,6-dimethylphenoxy)-ethyl]-α-chloroacetamide as a yellow oil having a boiling point of 171° to 173° C at 0.75 mm of Hg pressure and an index of refraction at 25° C of 1.5225.

EXAMPLE 13

Preparation of
N-Methyl-N-[β-(2,4-dichlorophenoxy)-ethyl]-propionamide

A solution of N-methyl-N-[β-(2,4-dichlorophenoxy)-ethyl]-amine (7 grams; 0.031 mol) and triethylamine (3 grams) in benzene (70 ml) was charged into a glass reaction flask equipped with mechanical stirrer, reflux condenser and addition funnel. The solution was stirred vigorously and a solution of propionyl chloride (2.9 grams) in benzene (10 ml) was slowly added over a period of several minutes. An exotherm was observed. After the addition was completed, the reaction mixture was further stirred for a period of about 30 minutes. After this time the reaction mixture was filtered and the filtrate was washed with dilute aqueous hydrochloric acid and with water and was dried over anhydrous magnesium sulfate. The dried solution was then filtered and stripped of benzene under reduced pressure to yield an oil which solidified upon standing. This solid was washed with cold pentane, was filtered and dried, and then was recrystallized from heptane to yield the desired product N-methyl-N-[β-(2,4-dichlorophenoxy)-ethyl]-propionamide having a melting point of 79° to 80° C.

EXAMPLE 14

Preparation of
N-Methyl-N-[β-(2,4-dichlorophenoxy)-ethyl]-α-chloroacetamide

A solution of N-methyl-N-[β-(2,4-dichlorophenoxy)-ethyl]-amine (13 grams; 0.059 mol) and triethylamine (6 grams) in benzene (70 ml) was charged into a glass reaction vessel equipped with mechanical stirrer, reflux condenser and addition funnel. The reaction mixture was stirred and chloroacetyl chloride (6.78 grams) dissolved in benzene (10 ml) was added dropwise over a period of several minutes. An exotherm was observed. Stirring was continued for a period of about 30 minutes at ambient temperatures. After this time the reaction mixture was filtered and the filtrate was washed with dilute aqueous hydrochloric acid and with water and was dried over anhydrous magnesium sulfate. The dried solution was then filtered and was stripped of benzene under reduced pressure to yield an oil which crystallized upon standing. This product was then recrystallized from heptane to yield the desired product N-methyl-N-[β-(2,4-dichlorophenoxy)-ethyl]-α-chloroacetamide having a melting point of 94° to 96° C.

EXAMPLE 15

Preparation of
N-Methyl-N-[β-(2,4-dichlorophenoxy)-ethyl]-α-thiocyanoacetamide

A mixture of N-methyl-N-[β-(2,4-dichlorophenoxy)-ethyl]-α-chloroacetamide (4 grams; 0.015 mol) and ethanol (50 ml) and sufficient acetone to cause complete dissolution was charged into a glass reaction flask equipped with mechanical stirrer, reflux condenser and internal thermometer. Potassium thiocyanate (2.5 grams) and a few crystals of sodium iodide were added to the flask and the reaction mixture was heated at reflux with stirring for a period of about 2 hours. After this time the reaction mixture was cooled and filtered. The filtrate was stripped under reduced pressure to yield a solid. This solid was extracted with boiling benzene, and the benzene extracts were filtered and evaporated under reduced pressure to yield an oil which solidified upon trituration with pentane. The solid was recovered by filtration and was recrystallized from ethanol to yield the desired product N-methyl-N-[β-(2,4-dichlorophenoxy)-ethyl]-α-thiocyanoacetamide having a melting point of 104° to 105° C.

Additional compounds within the scope of the present invention can be prepared in a manner similar to that detailed in the foregoing examples. In the following examples are given the essential ingredients required to prepare the indicated named compounds by the procedures heretofore described.

EXAMPLE 16

N-Ethyl-N-[β-(2-methyl-4-chlorophenoxy)-ethyl]-amine + acetyl chloride = N-ethyl-N-[β-(2-methyl-4-chlorophenoxy)-ethyl]-acetamide.

EXAMPLE 17

N-Isopropyl-N-[β-(4-bromophenoxy)-ethyl]-amine + α-bromoacetyl chloride = N-isopropyl-N-[β-(4-bromophenoxy)-ethyl]-α-bromoacetamide.

EXAMPLE 18

1-(2-Methyl-4-ethylphenoxy)-2-bromoethane + methoxyethylamine + β-chlorophropionyl chloride = N-methyl ethyl-N-[β-(2-methoxy-4-ethylphenoxy)-ethyl]-β-chloropropionamide.

EXAMPLE 19

1-(4-Methylthiophenoxy)-2-bromoethane + chloromethylamine + butanoyl chloride = N-chloromethyl-N-[β-(4-methylthiophenoxy)-ethyl]-butanamide.

EXAMPLE 20

1-(2,4-Dinitrophenoxy)-3-bromophropane + allylamine + hexanoyl chloride = N-allyl-N-[γ-(2,4-dinitrophenoxy)-propyl]-hexanamide.

EXAMPLE 21

1-(2-Dimethylaminophenoxy)-2-chloroethane + pentylamine + β, β, β-trifluorobutanoyl chloride = N-pentyl-N-[β-(2-dimethylaminophenoxy)-ethyl]-β, β, β-trifluorobutanamide.

Exemplary additional compounds within the scope of the present invention which can be prepared by the methods detailed in the foregoing examples are:

N-(3-methoxypropyl)-N-[β-(2-decyloxy-4-iodophenoxy)-ethyl]-α, α-dichloroacetamide N-decyl-N-[β-(3-fluoro-5-n-propylthiophenoxy)-ethyl]-β-thiocyanopropionamide N-bromomethyl-N-[β-(2-di-n-butylamino-4-decylphenoxy)-ethyl]-decanamide N-(3-thiocyanopropyl)-N-[β-(3-allyl-5-isopropoxyphenoxy)-ethyl]-α-chloroacetamide N-n-butyl-N-[β-(4-pentylthiophenoxy)-propyl]-α-thiocyanoacetamide N-(2-ethoxyethyl)-N-[β-(3-pentyl-5-nitrophenoxy)-ethyl]-α-thiocyanobutanamide N-methyl-N-[β-(3,4-dichlorophenoxy)-ethyl]-α-thiocyanopentanamide N-methyl-N-[β-(2,4-dibromophenoxy)-ethyl]-α-chloroacetamide N-isopropyl-N-[β-(2,6-diethylphenoxy)-ethyl]-α-bromoacetamide As heretofore mentioned the new compounds of this invention are useful as algaecides. That is, they can be used to control the growth of algae in water supplies such as are used for industrial or recreational purposes. Thus, water that is used in heat exchangers and cooling towers can be treated with the compounds of this invention to alleviate or eliminate slime formation and clogging of equipment. Further, in recreational uses of water, such as in lakes, ponds and swimming pools the control of algae often eliminates objectionable taste and odor in the water.

For practical use in controlling algae the active compounds of this invention can be used as such or can be formulated into compositions which comprise an inert carrier or a diluent and a toxic amount of such a compound. Such compositions which can also be called formulations often enable the active compound to be applied conveniently to the site of the algae infestation in any desired quantity. These compositions can be liquids such as solutions or emulsifiable concentrates, or solids such as granules, wettable powders or pellets.

Solutions of the active compounds of this invention can usually be prepared by dissolving the compound in a common organic solvent such as kerosene, xylene, acetone, methanol, or the like.

Emulsifiable concentrates comprise an active compound according to this invention, a solvent and an emulsifier. The solvent employed in an emulsifiable concentrate is not critical providing it dissolves the active compound. In some instances, however, it can be advantageous to use a solvent which itself exhibits some activity for the control of algae. Aromatic solvents derived from coal tar and petroleum are often of this nature. The emulsifiers most commonly used in these formulations are nonionic or mixtures of nonionic with anionic surface-active agents.

Solid formulations such as granules can be prepared by impregnating the active compound, usually dissolved in a suitable solvent, onto and into granulated carriers such as the attapulgites or the vermiculites, usually of a particle size range of from about 0.3 to about 5 mm. For example, a typical granular formulation can be prepared by charging adsorbent granules into a tumbler-blender and then applying a solution of the active compound in the form of a fine spray or mist until the desired concentration of the active ingredient is obtained.

Wettable powders consist of admixtures of finely divided powders of an inert carrier such as talc, clay, silica, pyrophyllite, and the like, and an active compound to which wetting agents have been added. Such formulations are usually prepared by grinding and blending the ingredients until a free-flowing dust of the desired particle size is obtained.

Pelletized formulations consist of an active compound, a solid inert carrier and a binding agent. Suitable binding agents are hardenable materials such as vinyl chloride-vinyl acetate copolymers, hydrocarbon resins, alkyd resins, natural and synthetic drying oils, rosin esters, varnishes, phenolic resins, and any of the film forming polymeric materials commonly used in the coatings industry.

Pellets are usually prepared by mixing the active compound, the inert carrier and the binding agent, which in most instances is in a solution form, until a paste results. This paste can then be extruded into pellets of any desired size or shape and can then be hardened upon evaporation of the solvent, upon heat curing of the polymeric materials or other methods as required. Such pelletized formulations often have the advantage of releasing the active ingredients at a controlled rate resulting in better and longer control of algae.

The concentration of the active compounds of this invention in the various formulations will vary greatly with the type of formulation and the purpose for which it is designed. But generally the formulations will contain from about 0.05 to about 95 percent by weight of the active compound of this invention.

The compounds of this invention can be applied to the site of the algae infestation in a manner recognized by the art. One method of controlling algae comprises contacting said algae with a toxic amount of a compound of this invention or a composition which comprises a carrier and an active compound of this invention. Another method of controlling algae comprises treating the water in which said algae grows with a toxic amount of a compound or composition heretofore described.

While there are vast numbers of known algae which can be controlled with the compounds of the present invention the more common ones can be classified into four major groups: the blue-green algae which include such forms as Oscillatoria, Anacystis and Desmonema; the green algae such as Chlorella, Pediastum and Spirogyra; the diatoms such as Cyclotella and Navicula; and the pigmented flagellates such as Euglena and Synura.

The quantity of active compound required to control algae can depend on a variety of factors such as the particular species involved, lighting conditions, water temperature, density of the infestation and the like. Generally a rate of from about 0.1 to about 100 parts per million in the water in which the algae are growing is sufficient for good control of algae.

The active compounds of the present invention are also useful when combined with other algaecides in the compositions heretofore described. These other materials can comprise from about 5 to about 95 percent by weight of the active ingredients in the compositions. Use of combinations of these other algaecides with the active compounds of this invention often provides compositions which are more effective than separate compositions of the individual compounds.

These other algeacides with which the active compounds of this invention can be combined include such compounds as copper sulfate, sodium arsenite, acroflavin, acrolein, alum, amitrol, ammonium sulfamate, sodium chlorate, atrazine, benzene hexachloride, CDEA, chlorinated benzene, 2,4-D, dalapon, dichlone, diquat, diuron, DNBP, DNC, DNCHP, 2,3DNQ, dichloropropionic acid, erbon, fenac, fenuron, ferbam, hexachloroacetone, IPC, potassium permanganate, MCPA, maleic hydrazide, monuron, colloidal silver, polychlorobenzoic acid, neburon, trichloroacetic acid, pentachloro phenol, pyridylmercuric acetate, 2,3-dichloronaphthaquinone, silvex, simazine 2,4,5-T, TBA, trichloroacetic acid, trichlorobenzene, trichloroethylene, potassium azide, ziram, and the like.

Such compounds can also be used in the form of their salts, esters, amides and other derivatives whenever applicable to the particular parent compound.

The effectiveness of the compounds of the present invention in controlling algae was demonstrated in experiments wherein the algeacidal activity against mixed unicellular algae, mixed filamentous algae and various individual species of algae as determined at various concentrations of active compound. These experiments were carried out by placing the algae into separate paper cups containing 150 mg of fertilizer and containing the test compound, formulated as an aqueous despersion of an acetone solution, at the indicated concentrations. The cups were then placed in a greenhouse where they were maintained under temperature and lighting conditions for a period of seven days. After this time the growth inhibition of the algae was determined and rated on a percent basis as compared to controls. The results of these experiments are given in the following tables.

TABLE I

CONTROL OF MIXED UNICELLULAR AND FILAMENTOUS ALGAE

| Test Compound | Concentration in PPM | Mixed Unicellular Algae | Mixed Filamentous Algae |
|---|---|---|---|
| Product of Example 2 | 11.125 | 100 | 100 |
| Product of Example 5 | 25 | 100 | 100 |
| Product of Example 6 | 25 | 90 | 95 |
| Product of Example 9 | 25 | 100 | —* |
| -do- | 5.56 | 99 | — |
| -do- | 2.78 | 75 | — |
| Product of Example 10 | 25 | 100 | — |
| -do- | 5.56 | 85 | — |
| Product of Example 11 | 25 | 100 | — |
| -do- | 5 | 90 | — |
| Product of Example 13 | 25 | 99 | — |
| -do- | 5 | 75 | — |
| Product of Example 14 | 25 | 100 | — |
| Product of Example 15 | 25 | 100 | — |
| -do- | 5 | 97 | — |

*Not tested.

TABLE II

CONTROL OF INDIVIDUAL SPECIES OF ALGAE

| Test Compound | Concn. in PPM | Hormidium spp | % Control Hydrodictyon spp | Spirogyra spp |
|---|---|---|---|---|
| Product of Example 2 | 11.125 | 99 | 100 | —* |
| Product of Example 9 | 5.56 | 90 | 100 | 98 |
| -do- | 2.78 | 80 | 98 | 65 |
| Product of Example 10 | 25 | 100 | — | — |
| -do- | 5.56 | 60 | 100 | 15 |
| Product of Example 11 | 25 | 99 | — | — |
| Product of Example 12 | 25 | 87 | — | — |
| Product of Example 13 | 25 | 95 | — | — |
| -do- | 5 | 90 | 15 | 95 |
| Product of Example 14 | 25 | 100 | — | — |
| -do- | 5 | 94** | 99** | 92** |
| -do- | 2 | 67** | 96** | 67** |
| -do- | 0.8 | 60** | 87** | 51** |
| Product of Example 15 | 25 | 100 | — | — |

*Not tested.
**Average of two experiments

We claim:
1. A compound of the formula

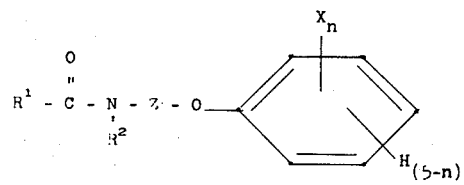

wherein $R^1$ is lower thiocyanoalkyl; $R^2$ is selected from the group consisting of hydrogen, lower alkyl, lower alkenyl, lower alkoxyalkyl, lower chloroalkyl and lower bromoalkyl; Z is an alkylene group of from one to four carbon atoms; X is selected from the group consisting of lower alkyl, lower alkenyl, chlorine, bromine, fluorine, lower alkoxy, lower alkylthio, nitro and di(lower alkyl)amino; and n is an integer from 0 to 3.

2. A compound of claim 1 N-methyl-N-[β-(2,6dimethylphenoxy)-ethyl]-α-thiocyanoacetamide.

* * * * *

UNITED STATES PATENT OFFICE
CERTIFICATE OF CORRECTION

PATENT NO. : 3,886,194

DATED : May 27, 1975

INVENTOR(S) : Alfred A. Levin and Sidney B. Richter

It is certified that error appears in the above-identified patent and that said Letters Patent are hereby corrected as shown below:

In the heading and in column 1, lines 1 and 2, for the title "N-PHENOXY-L-THIOCYANOALKANAMIDES" read -- N-PHENOXY-α-THIOCYANOALKANAMIDES --.

In the heading, for "Appl. No.: 236,299" read -- Appl. No.: 236,293 --.

In column 1, line 32, for "$R_2$" read -- $R^2$ --.

In column 2, line 42, for "changing" read -- charging --.

In column 2, line 51, after "$R^2$" insert -- is --.

In column 3, line 51, for "stripped to solvent" read -- stripped of solvent --.

In column 7, line 66, for "wad" read -- was --.

In column 9, lines 57 through 59, for "1-(2-Methyl-4-ethylphenoxy)-2-bromoethane + methoxyethylamine + β-chlorophropionyl chloride = N-methyl ethyl-N-[β-(2-methoxy-4-ethylphenoxy)-" read -- 1-(2-Methoxy-4-ethylphenoxy)-2-bromoethane + methoxyethylamine + β-chloropropionyl chloride = N-methoxy ethyl-N-[β-(2-methoxy-4-ethylphenoxy)- --.

In column 9, line 67, for "1-(2,4-Dinitrophenoxy)-3-bromophropane" read -- 1-(2,4-Dinitrophenoxy)-3-bromopropane --.

Signed and Sealed this ninth Day of December 1975

[SEAL]

Attest:

RUTH C. MASON
Attesting Officer

C. MARSHALL DANN
Commissioner of Patents and Trademarks